(12) United States Patent
Shikfa et al.

(10) Patent No.: US 9,286,487 B2
(45) Date of Patent: Mar. 15, 2016

(54) METHOD FOR PROTECTING CONFIDENTIALITY OF A FILE DISTRIBUTED AND STORED AT A PLURALITY OF STORAGE SERVICE PROVIDERS

(71) Applicant: Alcatel Lucent, Boulogne Billancourt (FR)

(72) Inventors: Abdullatif Shikfa, Nozay (FR); Serge Papillon, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/401,236

(22) PCT Filed: Apr. 18, 2013

(86) PCT No.: PCT/EP2013/058075
§ 371 (c)(1),
(2) Date: Nov. 14, 2014

(87) PCT Pub. No.: WO2013/171017
PCT Pub. Date: Nov. 21, 2013

(65) Prior Publication Data
US 2015/0161411 A1 Jun. 11, 2015

(30) Foreign Application Priority Data

May 16, 2012 (EP) .................................. 12305544

(51) Int. Cl.
*G06F 7/04* (2006.01)
*G06F 17/30* (2006.01)
(Continued)

(52) U.S. Cl.
CPC ........ *G06F 21/6218* (2013.01); *G06F 21/6209* (2013.01); *H04L 9/0894* (2013.01);
(Continued)

(58) Field of Classification Search
CPC . G06F 21/62; G06F 21/6209; G06F 21/6218; G06F 21/6227; G06F 21/6272; G06F 21/64; G06F 3/062; G06F 3/067; G06F 3/0638; G06F 3/0604; G06F 3/0605; G06F 3/0607; H04L 9/0894

USPC ..................................................... 726/26–27
See application file for complete search history.

(56) References Cited

U.S. PATENT DOCUMENTS

| | | | | |
|---|---|---|---|---|
| 8,132,073 | B1 * | 3/2012 | Bowers | H03M 13/3761 713/160 |
| 8,374,340 | B2 * | 2/2013 | Puech | 380/28 |

(Continued)

FOREIGN PATENT DOCUMENTS

| | | |
|---|---|---|
| JP | 2003-296179 A | 10/2003 |
| JP | 2004-118239 A | 4/2004 |
| JP | 2007-242019 A | 9/2007 |

OTHER PUBLICATIONS

"Trusted Storage over Untrusted Networks", Paulo Oliveira et al., Publication—IEEE Globecom 2010 proceedings, 2010.*

(Continued)

*Primary Examiner* — Jayesh Jhaveri
(74) *Attorney, Agent, or Firm* — Fay Sharpe LLP (57) ABSTRACT

This method comprises the steps of: —choosing (1) a security parameter n,—segmenting (2) the file in n chunks S1, ..., Sn, —randomly choosing (3) $n^2$ coefficients $a_{ij}$ for i=1, ..., n and j=1, ..., n,—verifying (3) that the vectors $a_{i1}, \ldots, a_{in}$, for i=1, ..., n, are linearly independent, otherwise generating the coefficients again, —computing (4) n linear combinations $Ci=a_{i1}S_1+ \ldots +a_{ij}S_j+ \ldots +a_{in}\cdot S_n$, for i=1, n,—choosing (5) n storage service providers $O_i, \ldots, O_n$ among said plurality of storage service provider, —generating (6a; 6b; 6c) n file identifiers $ID'_1, \ldots, ID'_n$ designating said file (F),—storing (6a; 6b; 6c) the combination Ci at the storage service provider $O_i$ in association with the file identifier $ID'_i$, for i=1, ..., n,—storing the file identifier $ID'_i$ and the provider identifier $O_i$, for i=1, ..., n, in a file descriptor corresponding to the file (F), this file descriptor being stored in a local memory (LM),—storing the set of coefficients $a_{i,1}, \ldots, a_{in}$ so that it can be re-associated with the combination $C_i$, for i=1, n;—randomly choosing n super-coefficients $a'_1, \ldots, a'_j, \ldots, a'_n$ for j=1, ..., n,—computing a linear over-combination $OC'=a'_1 \cdot C_1+ \ldots +a'_j \cdot C_j+ \ldots +a'_n \cdot C_n$,—and storing the over-combination OC' and the coefficients $a'_1, \ldots, a'_j, \ldots, a'_n$ for j=1, ..., n.

18 Claims, 5 Drawing Sheets

(51) Int. Cl.
   H04N 7/16 (2011.01)
   G06F 21/62 (2013.01)
   H04L 9/08 (2006.01)
   *G06F 3/06* (2006.01)
   *G06F 21/64* (2013.01)

(52) U.S. Cl.
   CPC .............. *G06F 3/062* (2013.01); *G06F 3/0604* (2013.01); *G06F 3/0605* (2013.01); *G06F 3/0607* (2013.01); *G06F 3/067* (2013.01); *G06F 3/0638* (2013.01); *G06F 21/62* (2013.01); *G06F 21/6227* (2013.01); *G06F 21/6272* (2013.01); *G06F 21/64* (2013.01); *G06F 2221/2149* (2013.01)

(56) References Cited

U.S. PATENT DOCUMENTS

| 9,047,475 | B2* | 6/2015 | Orsini | G06F 21/606 |
|---|---|---|---|---|
| 2003/0079222 | A1* | 4/2003 | Boykin | H04N 7/1675 725/31 |
| 2007/0214314 | A1* | 9/2007 | Reuter | G06F 3/0607 711/114 |
| 2010/0037056 | A1* | 2/2010 | Follis | G06F 11/1464 713/171 |
| 2012/0331249 | A1* | 12/2012 | Benjamin | G06F 3/0607 711/162 |
| 2013/0204849 | A1* | 8/2013 | Chacko | G06F 3/0604 707/692 |

OTHER PUBLICATIONS

Paulo F. Oliveira et al., "Trusted Storage over Untrusted Networks," IEEE Global Telecommunications Conference, pp. 1-5, XP031845991, Dec. 6, 2010.

International Search Report for PCT/EP2013/058075 dated Jul. 22, 2013.

* cited by examiner

FIG_1

FIG_6

FIG_7

FIG_8

METHOD FOR PROTECTING CONFIDENTIALITY OF A FILE DISTRIBUTED AND STORED AT A PLURALITY OF STORAGE SERVICE PROVIDERS

BACKGROUND OF THE INVENTION

1. Field of the Invention

The present invention generally relates to protecting confidentiality of a file distributed and stored at a plurality of storage service providers. In particular, it concerns cloud storage. Cloud storage is a model of networked online storage where data is stored in virtualized pools of storage which are generally hosted by third parties. Hosting companies operate large data centers, and people who require their data to be hosted buy or lease storage capacity from them. The data centre operators, in the background, virtualize the resources according to the requirements of the customer and expose them as storage pools, which the customers can themselves use to store files or data objects. Physically, the resource may span across multiple servers.

If no precaution is taken, all the stored data can be accessed by the cloud operator who can potentially use it with a malicious intent (e.g. reselling the information to the client's competitors). Furthermore, even if the cloud operator is honest, the confidentiality of stored data can be compromised by attackers who have greater interest in attacking data centers which aggregate data of several companies and users rather than attacking a single enterprise network. Therefore there is a need to protect the confidentiality of data at a storage service provider.

2. Description of the Prior Art

One known solution consists in encrypting the data before outsourcing its storage. The drawback of this solution is that it is resource consuming (encryption for storage and decryption for retrieval). Additionally it requires a key management process to keep trace of the keys used to encrypt each data packet. It further implies to securely store the keys, because it gives full access to the data if the key is leaked.

Another known solution consists in segmenting data in several chunks and store the chunk respectively at different storage service providers so that none of them has access to the full data. This solution has the drawback that each storage service provider has access to the chunk that it stores. So it can still derive some confidential information from it. A counter-measure is to further encrypt each chunk, with the drawback of the previous solution.

Another known solution is described in the article of PAULO F OLIVERA ET AL: "Trusted Storage over Untrusted Networks", GLOBECOM 2010, 2010 IEEE GLOBAL TELECOMMUNICATIONS CONFERENCE, IEEE, PISCATAWAY, N.J., USA, 6 Dec. 2010. It comprises the steps of:

- choosing a security parameter n, and segmenting the file in n chunks $S_1, \ldots, S_n$;
- randomly choosing n coefficients $a_j$, with $j=1, \ldots, n$, all $a_j$ being different from each other;
- then generating $n^2$ coefficients $a_{ij}$ for $i=1, \ldots, n$ and $j=1, \ldots, n$, by generating a Vandermonde matrix $(a_j^{i-1})$;
- computing n linear combinations $C_i = a_{i1} \cdot S_1 + \ldots + a_{ij} \cdot S_j + \ldots + a_{in} \cdot S_n$ for $i=1, \ldots, n$;
- choosing two different storage service providers and storing a portion of the linear combinations at the first storage service provider and the other linear combinations at the second storage service provider.

The randomly chosen n coefficients $a_j$, with $j=1, \ldots, n$, are different and independent from each other; but most of the $n^2$ coefficients $a_{ij}$ are not independent from each other because they are obtained by generating a Vandermonde matrix $(a_j^{i-1})$.

The aim of the present invention is to provide a more secure technical solution for protecting confidentiality of data distributed and store on a plurality of storage service providers.

This can be solved by applying, the methods according to the invention.

SUMMARY OF THE INVENTION

A first object of the invention is a method for protecting confidentiality of a file distributed and stored at a plurality of storage service providers comprising the steps of:

- choosing a security parameter n,
- segmenting the file in n chunks $S_1, \ldots, S_n$,
- choosing $n^2$ coefficients $a_{ij}$ for $i=1, \ldots, n$ and $j=1, \ldots, n$,
- verifying that the vectors $a_{i1}, \ldots, a_{in}$, for $i=1, \ldots, n$, are linearly independent, otherwise generating the coefficients again,
- computing n linear combinations $C_i = a_{i,1} \cdot S_1 + \ldots + a_{ij} \cdot S_j + \ldots + a_{in} \cdot S_n$, for $i=1, \ldots, n$,
- choosing n storage service providers $O_i, \ldots, O_n$ among said plurality of storage service provider,
- generating n file identifiers $ID'_1, \ldots, ID'_n$ designating said file,
- storing the combination $C_i$ at the storage service provider $O_i$ in association with the file identifier $ID'_i$, for $i=1, \ldots n$,
- storing the file identifier $ID'_i$ and the provider identifier $O_i$, for $i=1, \ldots, n$, in a file descriptor corresponding to the file, this file descriptor being stored in a local memory,
- and storing the set of coefficients $a_{i,1}, \ldots, a_{in}$ so that it can be re-associated with the combination $C_i$, for $i=1, \ldots n$;

characterized in that it further comprises the steps of:

- randomly choosing said $n^2$ coefficients $a_{ij}$ for $i=1, \ldots, n$ and $j=1, \ldots, n$,
- verifying that the vectors $a_{i1}, \ldots, a_{in}$, for $i=1, \ldots, n$, are linearly independent, otherwise generating the coefficients again,
- randomly choosing n super-coefficients $a'_1, \ldots, a'_j, \ldots, a'_n$ for $j=1, \ldots, n$,
- computing a linear over-combination $OC' = a'_1 \cdot C_1 + \ldots + a'_j \cdot C_j + \ldots + a'_n \cdot C_n$,
- and storing the over-combination $OC'$ and the coefficients $a'_1, \ldots, a'_j, \ldots, a'_n$ for $j=1, \ldots, n$.

The fact of computing linear combinations $C_i$ of all the chunks of the file to be distributed and stored, and then storing the combinations respectively at a plurality of storage service providers, protects the confidentiality of the file without requiring encryption or key management, because it is necessary to get all the combinations for retrieving any chunk of the original file. So the providers cannot extract any information from these combinations unless all the n providers collude. The fact of using $n^2$ randomly chosen coefficients and an over-combination improves the security.

According to a first peculiar embodiment of the method for protecting confidentiality of a file distributed and stored at a plurality of storage service providers, storing the set of coefficients $a_{i1}, \ldots, a_{in}$, so that it can be re-associated with the combination $C_i$, for $i=1, \ldots, n$, comprises the step of storing them at the storage service provider $O_i$, in association with the combination $C_i$ and the file identifier $ID'_i$, for $i=1, \ldots, n$.

According to a second first peculiar embodiment of the method for protecting confidentiality of a file distributed and stored at a plurality of storage service providers, storing the set of coefficients $a_{i1}, \ldots, a_{in}$, so that it can be re-associated with the combination $C_i$, for $i=1, \ldots, n$, comprises the steps of:

storing the set of coefficients $a_{i1}, \ldots, a_{in}$, at the storage service provider $O_k$, in association with a combination $C_k$ and a file identifier $ID'_k$, for $i=1, \ldots, n$ and for k lying between 1 and n, including 1 and n, and being different of i;

and storing a permutation enabling to re-associate the set of coefficients $a_{i1}, \ldots, a_{in}$ and the combination $C_i$, for $i=1, \ldots, n$, in said file descriptor corresponding to the file (F), and being stored in said local memory.

According to a third peculiar embodiment of the method for protecting confidentiality of a file distributed and stored at a plurality of storage service providers, storing the set of coefficients $a_{i1}, \ldots, a_{in}$ so that it can be re-associated with the combination $C_i$, for $i=1, \ldots, n$, comprises the step of storing the set of coefficients $a_{i1}, \ldots, a_{in}$, in association with a file identifier $ID'_i$ and a provider identifier $O_i$, for $i=1, \ldots, n$, in said file descriptor corresponding to the file, and being stored in said local memory.

Another object of the invention is a method for retrieving a file that has been protected by the method according to the invention, that comprises the steps of:

reading n file identifiers $ID'_1, \ldots, ID'_n$ designating said file, and reading provider identifiers $O_1, \ldots, O_n$, in a file descriptor corresponding to the file, this file descriptor being stored in a local memory,     sending the n file identifiers $ID'_1, \ldots, ID'_n$ respectively to the storage service providers designated by the provider identifiers $O_1, \ldots, O_n$,     receiving n combinations $C_1, \ldots, C_n$, from the providers designated by the provider identifiers $O_1, \ldots, O_n$,     retrieving n sets of coefficients $a_{i1}, \ldots, a_{in}$, for $i=1, \ldots, n$ that respectively correspond to the n combinations $C_1, \ldots, C_n$,     associating each combination $C_i$ with the corresponding set of coefficients $a_{i1}, \ldots, a_{in}$, for $i=1, \ldots, n$,     computing the inverse of a matrix composed of the n set of coefficients $a_{i1}, \ldots, a_{in}$, for $i=1, \ldots, n$, for obtaining another matrix composed of n sets of coefficients $b_{i1}, \ldots, b_{in}$, for $i=1, \ldots, n$,     then computing n chunks $S_1, \ldots, S_n$ of said file F as:

$$S_i = b_{i1} \cdot C_1 + \ldots + b_{ij} \cdot C_j + \ldots + b_{in} \cdot C_n \text{ for } i=1, \ldots, n,$$

then re-assembling the chunks $S_1, \ldots, S_n$ to reconstruct the file F;

characterized in that it further comprises the steps of:

reading an over-combination OC' and coefficients $a'_1, \ldots, a'_j, \ldots, a'_n$ for $j=1, \ldots, n$,     computing the inverse of a matrix composed of n−1 sets of coefficients $a_{i1}, \ldots, a_{in}$, for $i=1, \ldots, n-1$ and a set of coefficients $(a'_1 \cdot a_{1j} + \ldots + a'_i \cdot a_{ij} + \ldots + a'_n \cdot a_{nj})$ for $j=1, \ldots, n$, for obtaining another matrix composed of n sets of coefficients $b_{i1}, \ldots, b_{in}$, for $i=1, \ldots, n$,     then computing n chunks $S_1, \ldots, S_n$ of said file (F) as:

$$S_i = b_{i1} \cdot C_1 + \ldots + b_{ij} \cdot C_j + \ldots + b_{in-1} \cdot C_{n-1} + b_{in} \cdot OC' \text{ for } i=1, \ldots, n,$$

then re-assembling the chunks $S_1, \ldots, S_n$ to reconstruct the file (F).

According to a first peculiar embodiment of the method for retrieving a file, retrieving n sets of coefficients $a_{i1}, \ldots, a_{in}$ for $i=1, \ldots, n$, that respectively correspond to the n combinations $C_1, \ldots, C_n$, comprises the step of receiving them from the providers designated by the provider identifiers $O_1, \ldots, O_n$.

And associating each combination Ci with a corresponding set of coefficients $a_{i1}, a_{in}$, for $i=1, \ldots, n$, comprises the step of directly associating the combination Ci with the set of coefficients $a_{i1}, \ldots, a_{in}$.

According to a second peculiar embodiment of the method for retrieving a file, retrieving n sets of coefficients $a_{i1}, \ldots, a_{in}$ for $i=1, \ldots, n$, that respectively correspond to the n combinations $C_1, \ldots, C_n$, comprises the step of receiving them from the providers designated by the provider identifiers $O_1, \ldots, O_n$;

And associating each combination $C_i$ with a corresponding set of coefficients $a_{i1}, \ldots, a_{in}$, for $i=1, \ldots, n$ comprises the steps of:

reading a permutation in the file descriptor corresponding to said file,     and applying the permutation to the sets of coefficients $a_{i1}, \ldots, a_{in}$, for $i=1, \ldots, n$, so that each combination $C_i$ is associated with the corresponding set of coefficients $a_{i1}, \ldots, a_{in}$, for $i=1, \ldots, n$.

According to a third peculiar embodiment of the method for retrieving a file, retrieving n sets of coefficients $a_{i1}, \ldots, a_{in}$, for $i=1, \ldots, n$, that respectively correspond to the n combinations $C_1, \ldots, C_n$, comprises the step of reading them in the file descriptor corresponding to said file, and wherein associating each combination $C_i$ with a corresponding set of coefficients $a_{i1}, \ldots, a_{in}$, for $i=1, \ldots, n$ comprises the step of directly associating the set of coefficients $a_{i1}, \ldots, a_{in}$ to the combination $C_i$, for $i=1, \ldots, n$.

Another object of the invention is a method for protecting confidentiality of a file distributed and stored at a plurality of storage service providers, peculiarly well suited in situations where the storage is performed once but retrieval is performed many times or by many entities. It comprises the steps of:

choosing a security parameter n, segmenting the file in n chunks $S_1, \ldots, S_n$, randomly choosing $n^2$ coefficients $a_{ij}$ for $i=1, \ldots, n$ and $j=1, \ldots, n$,     verifying that the vectors $a_{i1}, \ldots, a_{in}$, for $i=1, \ldots, n$, are linearly independent, otherwise generating the coefficients again,     computing n linear combinations $C_i = a_{i1} \cdot S_1 + \ldots + a_{ij} \cdot S_j + \ldots + a_{in} \cdot S_n$, for $i=1, \ldots, n$,     choosing n storage service providers $O_i, \ldots, O_n$ among said plurality of storage service provider,     generating n file identifiers $ID'_1, \ldots, ID'_n$ designating said file,     storing the combination $C_i$ at the storage service provider $O_i$ in association with the file identifier $ID'_i$, for $i=1, \ldots, n$,     storing the file identifier $ID'_i$, and the provider identifier $O_i$ for $i=1, \ldots, n$, in a file descriptor corresponding to the file, this file descriptor being stored in a local memory,     computing the inverse of a matrix composed of the n set of coefficients $a_{i1}, \ldots, a_{in}$, for $i=1, \ldots, n$, for obtaining another matrix composed of n sets of coefficients $b_{i1}, \ldots, b_{in}$, for $i=1, \ldots, n$,     and storing the set of coefficients $b_{i1}, \ldots, b_{in}$ so that it can be re-associated with the combination $C_i$, for $i=1, \ldots, n$.

Another object of the invention is a method for retrieving a file that has been protected by this last method. It comprises the steps of:

reading n file identifiers $ID'_1, \ldots, ID'_n$ designating said file, and reading provider identifiers $O_1, \ldots, O_n$, in a file descriptor corresponding to the file (F), this file descriptor being stored in a local memory, sending the n file identifiers $ID'_1, \ldots, ID'_n$ respectively to the storage service providers designated by the provider identifiers $O_1, \ldots, O_n$, receiving n combinations $C_1, \ldots, C_n$, from these providers designated by the provider identifiers $O_1, \ldots, O_n$, retrieving n sets of coefficients $b_{i1}, \ldots, b_{in}$, for $i=1, \ldots, n$, that respectively correspond to the n combinations $C_1, \ldots, C_n$, associating each combination $C_i$ with the corresponding set of coefficients $b_{i1}, \ldots, b_{in}$, for $i=1, \ldots, n$, computing chunks $S_1, \ldots, S_n$ of said file as:

$$S_i = b_{i1} \cdot C_1 + \ldots + b_{ij} \cdot C_j + \ldots + b_{in} \cdot C_n \text{ for } i=1, \ldots, n,$$

then re-assembling the chunks $S_1, \ldots, S_n$ to reconstruct the file F.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which.

DETAILED DESCRIPTION OF THE PREFERRED EMBODIMENTS

Figure 1:
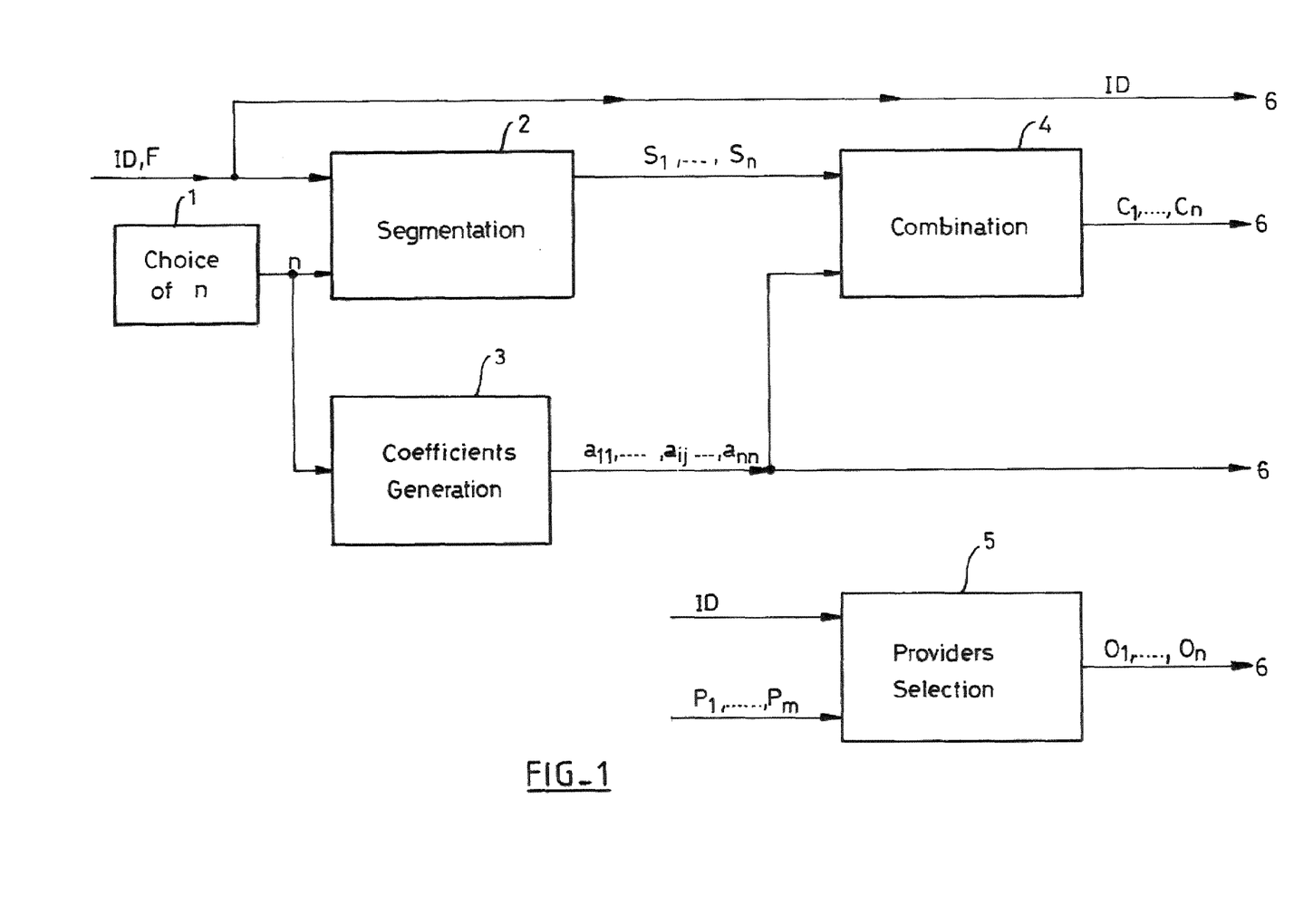
FIG. 1 illustrates first steps that are common to three embodiments of the method for protecting a file, according to the invention.

FIG. 1 illustrates steps that are common to three embodiments of the method for protecting a file, according to the invention. For instance, we consider a user who has a storage constrained device (e.g. a mobile phone, or a tablet) and wants to outsource the storage of large files. We assume that the user knows m available storage service providers that he/she can use because he/she already has accounts there and associated contracts.

The proposed method requires the following means in the device:

1/ Means for associating a unique identifier ID to each file F to be distributed and stored at storage service providers. This process could potentially be complex but it can use the path of the file, or tags, or any other known method compatible with file system architectures.

2/ Input means enabling a user to choose a security parameter n. This parameter can be different for each file: A bigger value of n involves more computation but also more security. So the values of n can be chosen according to the wanted level of confidentiality such as: restricted, confidential, secret . . . .

3) Computing means executing a program comprising computer-executable instructions for performing the proposed method.

Step 1: The user chooses a security parameter n, lower than or equal to the number m of available storage service providers.

Step 2: The computing means segment the file F in n chunks $S_1, \ldots, S_n$. The chunks must comprise a same number of bits. The number of bits per chunk is the smallest integer which is bigger than size(F)/n and is a multiple of the size p of the field in which the operation takes place (the same field as the one where the coefficients are chosen). This process implies a padding of the file in order to have n chunks of the same size. Any standard padding algorithm can be used to perform this task.

Step 3: The computing means randomly choose $n^2$ coefficients $a_{ij}$ for $i=1, \ldots, n$ and $j=1, \ldots, n$. Then the computing means verify that the chosen vectors $(a_{i1}, \ldots, a_{in})$ for $i=1, \ldots n$, are linearly independent, otherwise they generate the coefficients again (A set of vectors is linearly independent if and only if the only representations of the zero vector as linear combinations of its elements are trivial solutions).

Step 4: The computing means compute n linear combinations as:

$$C_i = a_{i1} \cdot S_1 + \ldots + a_{ij} \cdot S_j + \ldots + a_{in} \cdot S_n \text{ for } =1, \ldots, n$$

Step 5: The computing means choose n storage service providers where the combinations will be stored (n is lower or equal to m). They choose them among the m available storage services providers, as a function of the identifier ID of the file to be stored and protected. They supply the respective identifiers $O_1, \ldots, O_n$ designating the chosen storage service providers. There are many possibilities to perform the selection: a random selection is the easiest, but the criterion of choice could also take performance (load balancing), cost (pricing at each provider) or security (reputation of providers) into account, to have a better selection policy. Depending on the selection policy, one particular provider could be the local host itself, and a given provider could be chosen more than once (although this would decrease security).

Figure 2:
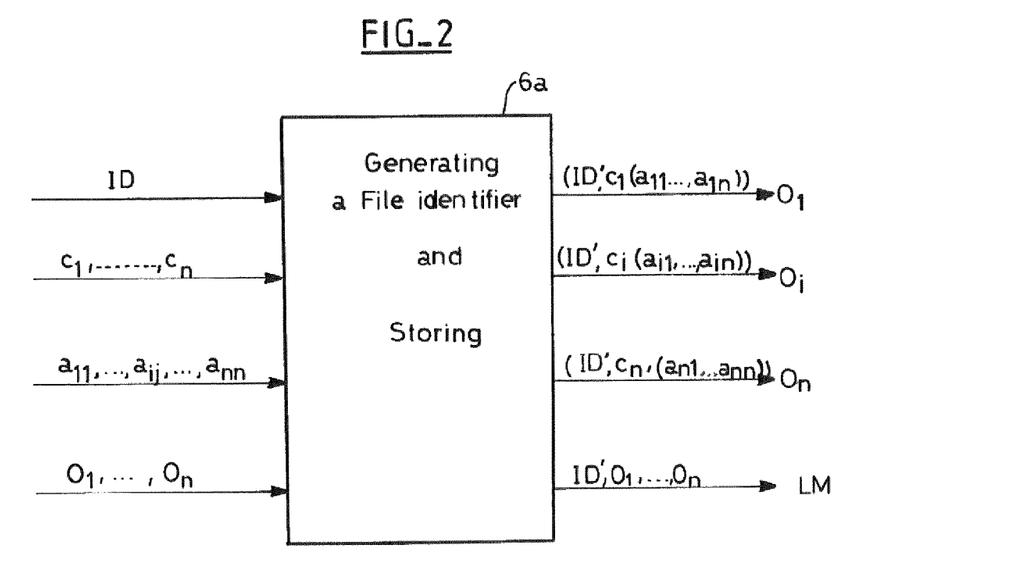
FIGS. 2, 3, 4 respectively illustrate steps that are specific to three embodiments of the method for protecting a file, according to the invention.
Figure 3:
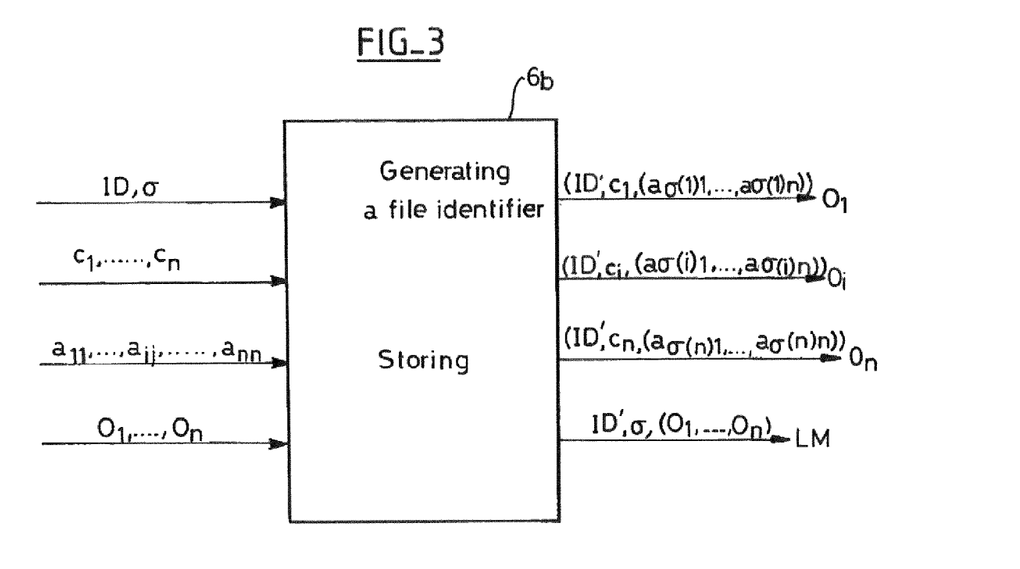
Figure 4:
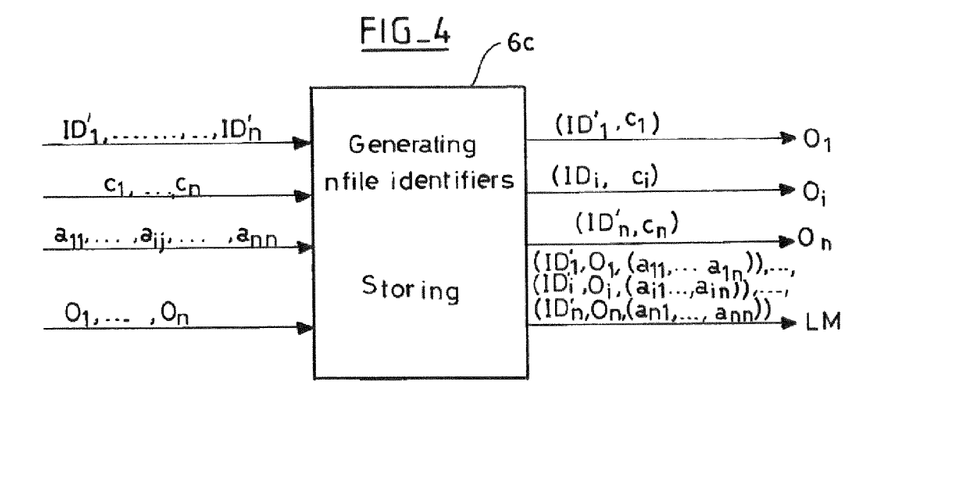

The next steps can be made according to three variants called step 6a, step 6b, step 6c that are respectively illustrated by FIGS. 2, 3, 4.

FIG. 2 illustrates Step 6a wherein:

The computing means generate a new unique file identifier ID', also designating the file F, but different of the local file identifier ID, as a function of the local identifier ID. This function should not allow to recover ID given ID', hence it is essentially a one way function, for example a hash function. This new file identifier ID' will be exposed to all the storage service providers.

The computing means send, to a provider $O_i$, for $i=1, \ldots, n$:

a combination $C_i$, the set of coefficients $a_{i1}, \ldots, a_{in}$, and the file identifier ID'.

The provider $O_i$, stores the combination $C_i$, and the set of coefficients $a_{i1}, \ldots, a_{in}$, in association with the file identifier ID'.

The computing means locally store, in a local memory LM, a very simple file descriptor for the file F: This file descriptor comprises the file identifier ID' designating the file F, and the provider identifiers $O_1, \ldots, O_n$ designating the chosen storage service providers.

According to an improvement of this variant a, it is also possible to replace the unique file identifier ID' by different file identifiers $ID'_1, \ldots, ID'_n$, for the same file F. These file identifiers ID'$_1$, . . . , ID'$_n$ are respectively stored at the n chosen providers respectively, and in the file descriptor corresponding to the file F, in the local memory LM. This improvement makes the combinations more difficult to link in case of providers' collusion.

FIG. 3 illustrates Step 6b wherein:

The computing means generate a new file identifier ID', also designating the file F, but different of the local file identifier ID, as a function of the local identifier ID, by a one way function, for example a hash function. This new file identifiers ID' will be exposed to all the storage service providers.

The computing means send, to a provider O$_i$, for i=1, . . . , n:
the new file identifier ID' designating the file F,
the combination C$_i$,
and a set of coefficients a$_{k1}$, . . . , a$_{kn}$ corresponding to another combination C$_k$ for k lying between 1 and n, including 1 and n, and being different of i.

The set of coefficients a$_{k1}$, . . . , a$_{kn}$ is determined by a permutation σ applied to the vectors (a$_{i1}$, . . . , a$_{in}$) for i=1, . . . , n:

(a$_{k1}$, . . . , a$_{kn}$)=(a$_{\sigma(n)1}$, . . . , a$_{\sigma(n)i}$, . . . , a$_{\sigma(n)n}$)=coefficients corresponding to the combination C$_{\sigma(i)}$ On the other hand, for i=1, . . . , n, the combination C$_{\sigma(i)}$ is stored in association with the set of coefficients a$_{i1}$, . . . , a$_{in}$ at the provider O$_{\sigma(i)}$. The computing means define the permutation σ on the integers from 1 to n. Basically this permutation can be represented as an array (σ(1), . . . , σ(i), . . . , σ(n)) containing all the integers between 1 and n but in a non-ordered way.

The computing means store, at provider O$_i$, for i=1, . . . , n, in association:
the new file identifier ID' designating the file F,
the combination C$_i$,
and a set of coefficients a$_{k1}$, . . . , a$_{kn}$.

The computing means locally store, in a local memory LM, a very simple file descriptor for the file F. This file descriptor comprises:
the identifier ID' designating the file F,
the identifiers O$_1$, . . . , O$_n$ of the chosen storage service providers,
and the permutation σ (e.g. in the form of an array as explained previously).

According to an improvement of this variant a, it is also possible to replace the unique file identifier ID' by different file identifiers ID'$_1$, . . . , ID'$_n$, for the same file F. These file identifiers ID'$_1$, . . . , ID'$_n$ are respectively stored at the n chosen providers respectively, and in the file descriptor corresponding to the file F, in the local memory LM. This improvement makes the combinations more difficult to link in case of providers' collusion.

FIG. 4 illustrates step 6c wherein:

The computing means generate different file identifiers ID'$_1$, . . . , ID'$_n$, for the same file F, as a function of the local identifier ID, by a one way function, for example a hash function—The computing means send, to a provider O$_i$, the file identifier ID'$_i$ and the combination C$_i$, for i=1, . . . , n, but they do not send any set of coefficients.

According to this variant c, the computing means locally store a larger file descriptor, in the local memory LM. For i=1, . . . , n, this file descriptor comprises triplets, each triplet comprising for i=1, . . . , n:
an identifier ID'$_i$ designating the file F,
a service provider identifier O$_i$,
and the set of coefficients a$_{i1}$, . . . , a$_{in}$ that was used to construct the combination C$_i$.

Figure 5:
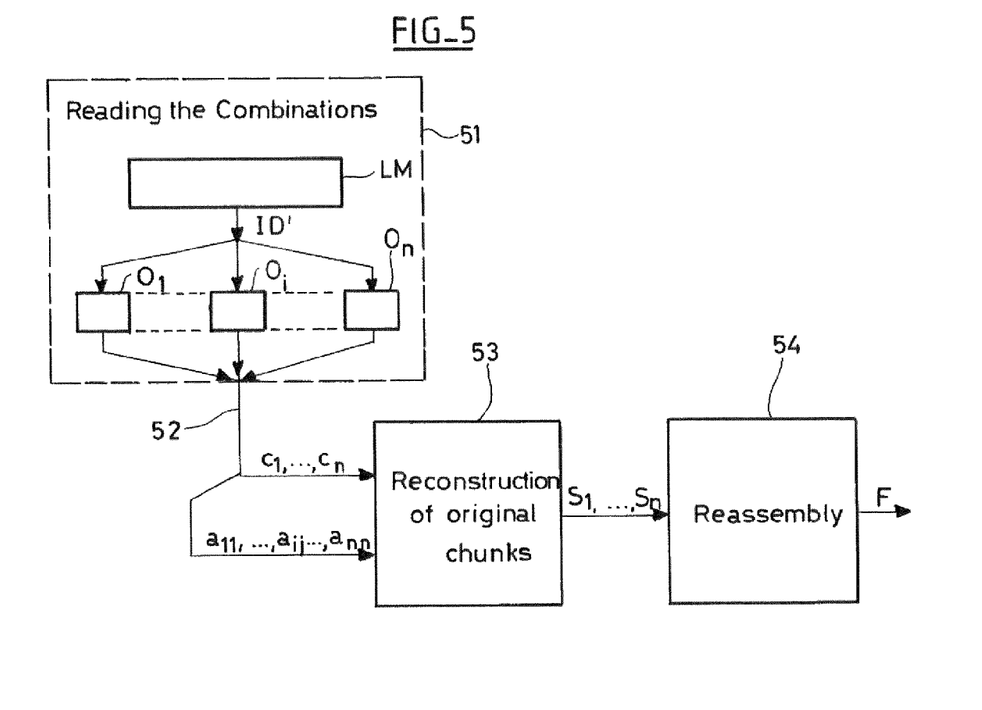
FIG. 5, 6, 7 respectively illustrate three embodiments of the method for retrieving a file that has been protected according to the invention.
Figure 6:
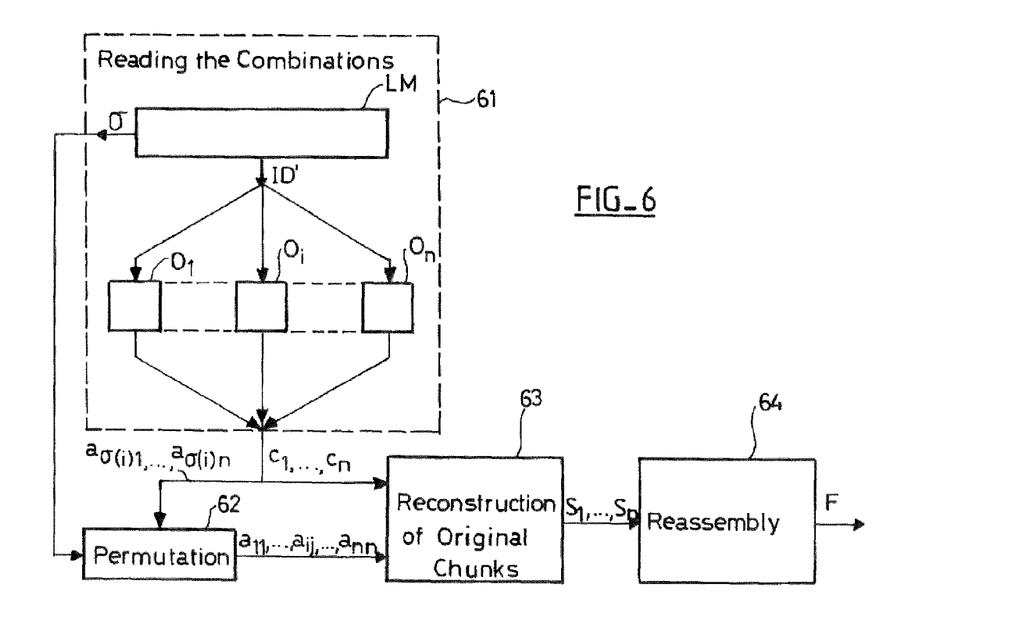
Figure 7:
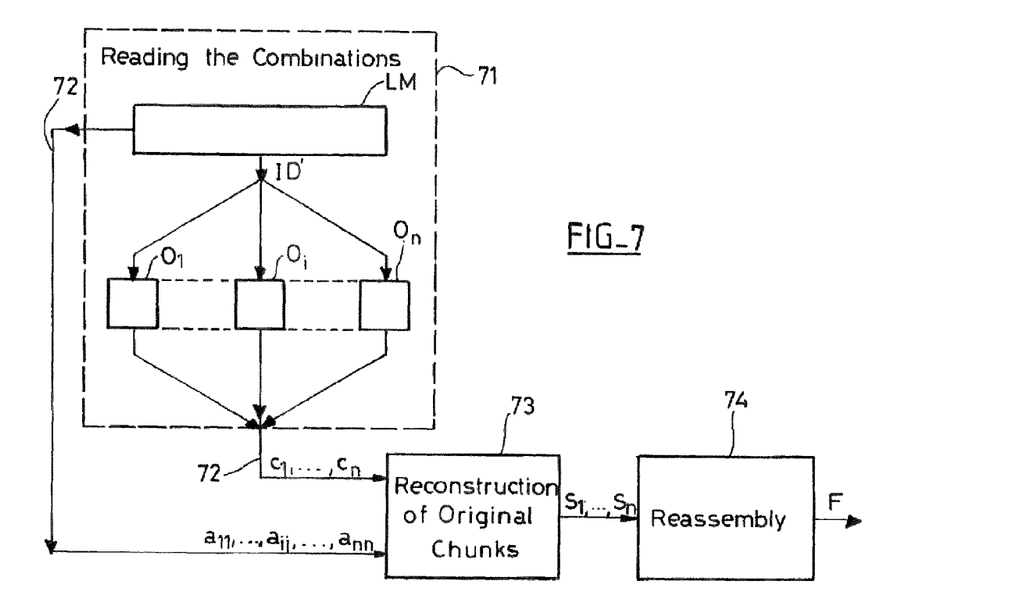

FIGS. 5, 6, 7 respectively illustrate three embodiments of the method for retrieving a file that has been protected according to the invention. The retrieving can be done according to three variants a, b, c corresponding to the variants 6a, 6b, 6c of step 6, described above for protecting the file.

FIG. 5 illustrates the variant a:

To reconstruct the file F, the computing means of the device request a combination and the set of coefficients corresponding to this combination, from each of the n chosen storage service providers (in any order).

Step 51: The computing means read the file identifier ID' and the provider identifiers O$_1$, . . . , O$_n$ registered in the file descriptor corresponding to the file F, in the local memory LM. They send the identifier ID' to the storage service providers O$_i$ for i=1, . . . , n.

Step 52: Then the computing means receive, from the provider O$_i$, for i=1, . . . , n:
the combination Ci,
and the corresponding set of coefficients a$_{i1}$, . . . , a$_{in}$.

The combination Ci is directly associated to the set of coefficients a$_{i1}$, . . . , a$_{in}$, for the process of retrieving the file F.

Step 53: Then the computing means compute the inverse of the matrix A=(a$_{ij}$), and obtain a matrix B=(b$_{ij}$). Then they compute the original chunks as:

$$S_i = b_{i1} \cdot C_1 + \ldots + b_{ij} \cdot C_j + \ldots + b_{in} \cdot C_n \text{ for } i=1, \ldots, n.$$

Step 54: Then the computing means re-assemble the chunks S$_1$, . . . , S$_n$ and possibly removes the padding to reconstruct the file F.

Note that if different identifiers ID'$_1$, . . . , ID'$_n$ have been respectively stored at each provider, for a same file F, the retrieval method is modified, since it comprises a modified step 51 consisting in reading the different identifiers ID'$_1$, . . . , ID'$_n$ in the file descriptor, stored in the local memory LM, and respectively sending the identifiers ID'$_1$, . . . , ID'$_n$ to the n chosen providers, instead of sending the unique identifier ID'.

FIG. 6 illustrates the variant b:

To reconstruct the file F, the computing means of the device request a combination and a set of coefficients, from each of the n chosen storage service providers (in any order). But they must re-associate each combination with the corresponding set of coefficients that was used for computing this combination, since this combination and this set of coefficients were not stored at a same storage service provider. The permutation σ must be used again because the combination C$_{\sigma(i)}$ (corresponding to the set of coefficients stored by O$_i$) is stored at the provider O$_{\sigma(i)}$.

Step 61:

The computing means read the file identifier ID', the provider identifiers O$_1$, . . . , O$_n$, and the permutation σ, registered in the file descriptor corresponding to the file F, in the local memory LM.

They send the identifier ID' to the n storage service providers designated by the provider identifiers O$_1$, . . . , O$_n$.

They receive, from the provider O$_i$ for i=1, . . . , n:
the combination C$_i$,
and the set of coefficients a$_{\sigma(i)1}$, . . . , a$_{\sigma(i)n}$.

Step 62: Then they re-associate the combinations Ci and the corresponding set of coefficients a$_{i1}$, . . . , a$_{in}$, for i=1, . . . , n, by means of the permutation σ.

Step 63: Then they compute the inverse of the matrix A=(a$_{ij}$), and obtain a matrix B=(b$_{ij}$), and they compute the original chunks as:

$$S_i = b_{i1} \cdot C_1 + \ldots + b_{ij} \cdot C_j + \ldots + b_{in} \cdot C_n \text{ for } i=1, \ldots, n.$$

Step 64: Then they reconstruct the file F by assembling then n chunks $S_1, \ldots, S_n$ and possibly removing the padding.

FIG. 7 illustrates the variant c:

To reconstruct the file F, the computing means of the device request a combination and a set of coefficients corresponding to this combination, from each of the n chosen storage service providers (in any order).

Step 71: The computing means read the file identifiers $ID'1, \ldots, ID'n$, and the provider identifiers $O_1, \ldots, O_n$ registered in the file descriptor corresponding to the file F, in the local memory LM.

They send the file identifier $ID'_i$ to the provider $O_i$ for $i=1, \ldots, n$ (The n identifiers $ID'_1, \ldots, ID'_n$ are different one from another).

In response, the computing means receive the combination $C_i$ from the provider $O_i$, for $I=1, \ldots, n$.

Step 72: They read the coefficients $a_{i1}, \ldots, a_{in}$, in the local memory LM. The combination $C_i$ is directly associated to the set of coefficients $a_{i1}, \ldots, a_{in}$, for $I=1, \ldots n$.

Step 73: Then they compute the inverse of the matrix $A=(a_{ij})$, and obtain a matrix $B=(b_{ij})$. Then they compute the n original chunks as:

$$S_i = b_{i1} \cdot C_1 + \ldots + b_{ij} \cdot C_j + \ldots + b_{in} \cdot C_n \text{ for } i=1, \ldots, n.$$

Step 74: Then they reconstruct the file F by assembling the n chunks $S_1, \ldots, S_n$ and possibly removing the padding.

Security:

In every variant, a basic security of the scheme lays in the fact that it is impossible to recover any chunk $S_i$ without all the combinations $C_1, \ldots, C_n$. Hence the only possibility for operators to break the confidentiality of the file F, is to collude all together.

The variants a, b and c provide different levels of security, in the event of all n operators are colluding:

Variant a: If they collude all together, they obtain all the combinations and all the sets of coefficients, then they can retrieve the full file F.

Variant b: If they collude all together, they obtain all the combinations and the coefficients but without knowing the correspondence between combinations and sets of coefficients. In order to retrieve F, they must try all the n! correspondence possibilities. If n is large enough, the processing cost becomes prohibitive in practice.

Variant c: If they collude all together, they obtain the combinations but they don't know the sets of coefficients, so they cannot retrieve the file F, unless they try all possible sets of coefficients, which proves to be computationally infeasible (if each coefficient lies in a field of size p, there are $p^n$ possibilities, so a careful choice of p and n can easily make this value out of reach for processing capabilities). This variant c offers the highest level of security; however it also requires that the device stores the coefficients locally, whereas in variants a and b the device does not have to store any additional information.

Resilience (Optional Improvement):

The only weakness of the method is that if one operator $O_i$ loses (or corrupts) a combination $C_i$, then it becomes impossible to retrieve the file F.

A first improvement, in order to circumvent this drawback, consists in generating not n but n+k combinations and storing them at n+k operators. Then retrieving any n combinations out of the n+k combinations is possible and sufficient to reconstruct the file F. This means that it is possible to recover from the failure of up to k storage service providers.

When storing at n+k operators, the security remains the same: At least n operators have to collude to break the scheme. This solution applies well to the variants a and c.

A different improvement for variant c, in order to circumvent this drawback, consists in generating at least one additional combination (that we call over-combination) on-the-fly; this can be performed without requiring to reconstitute the original file F. An over-combination OC' is a linear combination of the combinations $C_i$ for $i=1, \ldots, n$. This improvement comprises the steps of:

randomly choosing a set of n coefficients $a'_j$, (that we call super-coefficients) for $j=1, \ldots, n$, computing a linear over-combination $OC' = a'_1 \cdot C_1 + \ldots + a'_j \cdot C_j + \ldots + a'_n \cdot C_n$, and storing the over-combination OC' and the n super-coefficients $a'_j$.

The n super-coefficients $a'_j$ and the over-combination OC' can be generated and stored by any entity comprising computing means and a memory. We call it "orchestrator" because it manages the retrieving of the combinations and over-combinations for ensuring resiliency. The orchestrator can be located at any place in the network:

It can be at a different cloud service provider, or possibly collocated with one of the n storage service providers used for storing the combinations $C_i$ for $i=1, \ldots, n$.

It may be in the user device

It can also be in between the user device and the storage operators, for example in a set-top box.

Functionally, the orchestrator is an intermediary in charge of managing availability of the data without being necessarily trusted by the source. This solution hence suits variant c very well, and the orchestrator is given the n combinations $C_1, \ldots, C_j \ldots, C_n$ without the coefficients $a_{i1}, \ldots, a_{in}$ for $i=1, \ldots, n$.

Retrieving the original file F is performed by a method similar to the method described above because a linear over-combination $OC' = a'_1 \cdot C_1 + \ldots + a'_j \cdot C_j + \ldots + a'_n \cdot C_n$ is also a linear combination of the segments $S_i$ for $i=1, \ldots, n$. Indeed $C_i = a_{i1} \cdot S_1 + \ldots + a_{ij} \cdot S_j + \ldots + a_{in} \cdot S_n$, for $i=1, \ldots, n$. The corresponding coefficients in terms of the segments $S_i$ are thus obtained by multiplying the coefficients $a'_i$ of the over-combination OC' in terms of $C_i$, and the coefficients $a_{ij}$ of the combinations $C_i$ in terms of segments $S_i$.

We can express the over-combination OC' in term of the segments $S_i$ as follows:

$$C' = (a'_1 \cdot a_{11} + \ldots + a'_i \cdot a_{i1} + \ldots + a'_n \cdot a_{n1}) \cdot S_1 + \ldots \\ + (a'_1 \cdot a_{1j} + \ldots + a'_i \cdot a_{ij} + \ldots + a'_n \cdot a_{nj}) \cdot S_j + \ldots \\ + (a'_1 \cdot a_{1n} + \ldots + a'_i \cdot a_{in} + \ldots + a'_n \cdot a_{nn}) \cdot S_n \text{ for } i=1, \ldots, n$$

So the retrieving can be done by inverting a matrix.

For instance, the orchestrator that manages resiliency of the data in the cloud comprises a memory for storing the combinations $C_1, \ldots, C_j, \ldots, C_n$, and computing means for:

generating n super-coefficients $a'_1, \ldots, a'_n$, and computing a super-combination $OC' = a'_1 \cdot C_1 + \ldots + a'_j \cdot C_j + \ldots + a'_n \cdot C_n$.

(Optionally it can generate a plurality of sets of super-coefficients for computing a plurality of super-combinations: one over-combination enables to circumvent the loss of only one storage service provider, while k over-combinations enable to circumvent the loss of k storage service providers). The over-combination OC' is then stored at a different storage provider. The orchestrator monitors the availability of the combinations stored at the storage providers. Whenever the Orchestrator detects a faulty storage operator, it generates an additional over-combination and stores it at another storage provider.

For retrieving the original file F, the user device requests the retrieving of file F (designated by an identifier ID') from the orchestrator.

The orchestrator requests the n combinations respectively from the n storage operators.

If the n storage operators are normally working, the orchestrator receives the n combinations $C_1, \ldots, C_j, \ldots, C_n$. The orchestrator forwards them to the user device. This latter can reconstruct the file F as explained above.

If one of the n storage operators is not working anymore, the orchestrator receives n−1 combinations $C_1, \ldots, C_j, \ldots, C_{n-1}$ because the storage provider that stored the combination $C_n$ has failed. Then the orchestrator forwards them to the user device, along with an over-combination OC' (fetched from the corresponding storage provider) and the super-coefficients $a'_1, \ldots, a'_n$.

The computing means of the user device retrieve all the segments $S_1, \ldots, S_n$ by:

Inverting the matrix constituted by the coefficients of the retrieved fragments which are either directly the ($a_{ij}$) for j=1, n for a chunk $C_i$ or the $(a'_1 \cdot a_{ij} + \ldots + a'_i \cdot a_{ij} + \ldots + a'_n \cdot a_{nj})$ for j=1, \ldots, n, for an over-combination OC'. With the inversion the computing mean obtains another matrix composed of n sets of coefficients $b_{i1}, \ldots, b_{in}$, for i=1, \ldots, n.

Then computing n chunks $S_1, \ldots, S_n$ of said file F as $S_i = b_{i1} \cdot C_1 + \ldots + b_{ij} \cdot C_j + \ldots + b_{in} \cdot OC'$ for $i=1, \ldots, n$.

Then re-assembling the chunks $S_1, \ldots, S_n$ and removing padding to reconstruct the file F.

The computation presented before with one over-combination can be generalized to the case of a plurality of over-combinations in a straightforward way. M super-combinations enable to cover the cases where up to M storage operators have failed. If k storage operators have failed (with k<M), n-k chunks (and n-k sets of coefficients) and k over-combinations (with their associated coefficients) are used for the matrix inversion. Since an over-combination can be expressed as an original combination, by the formula $C' = (a'_1 \cdot a_{11} + \ldots + a'_i \cdot a_{i1} + \ldots + a'_n \cdot a_{n1}) \cdot S_1 + \ldots + (a'_1 \cdot a_{1j} + \ldots + a'_i \cdot a_{ij} + \ldots + a'_n \cdot a_{nj}) \cdot S_j + \ldots + (a'_1 \cdot a_{1n} + \ldots + a'_i \cdot a_{in} + \ldots + a'_n \cdot a_{nn}) \cdot S_n$ for i=1, \ldots, n there is no difficulty to use over-combinations instead of lost combinations, both are processed in the same way.

The variant b, on the contrary, is strictly designed with n combinations and $n^2$ coefficients for n chunks. Resilience to the loss of a combination could be provided by another method, through redundancy or error coding but not as an intrinsic feature of the proposed method.

Performance Trade-Off (Optional Improvement):

A key aspect of the proposed method is its efficiency and the fact that it conciliates security and performance. To further stress on this aspect, we can offer an additional trade-off in the computation between the user who stores the data (we will call it the source for simplicity) and the users who retrieve the data (we will call them fetchers as they are not necessarily the same as the one who stores the data). In the above described embodiments, the source performs the combination and the fetchers perform the reconstruction which implies a matrix inversion, so the efforts are halved between the source and the fetchers.

However, we can also propose that the source computes the combinations and additionally pre-computes the inverse matrix and directly stores the coefficients $b_{ij}$ of the inverse matrix instead of the direct coefficients $a_{ij}$, at the storage service providers or at the local memory LM. This will then enable fetchers to retrieve directly the inverse matrix and perform a simple matrix multiplication to reconstruct the file F. Hence this mode of operation increases the computation burden on the source but drastically decreases it for the fetchers, and is therefore well suited in situations where the storage is performed once but retrieval is performed many times or by many entities. This mode of operation is compatible with all three approaches (a), (b) and (c).

Figure 8:
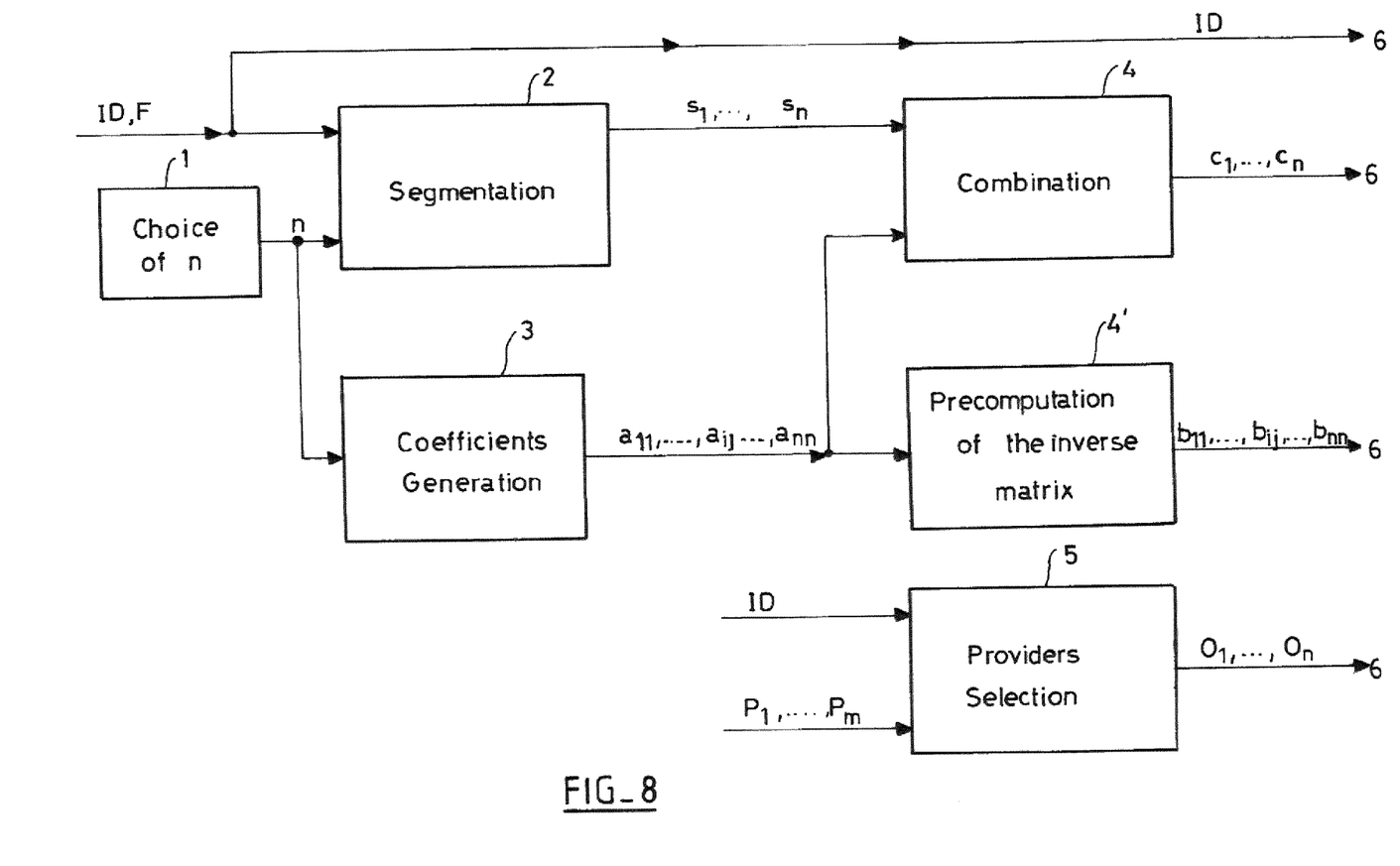
FIG. 8 illustrates first steps that are common to three other embodiments of the method for protecting a file, according to the invention, these embodiments being peculiarly well suited in situations where the storage is performed once but retrieval is performed many times or by many entities.

FIG. 8 illustrates first steps that are common to three embodiments of the method for protecting a file, according to the invention, these embodiments being peculiarly well suited in situations where the storage is performed once but retrieval is performed many times or by many entities. The first steps are modified in order to pre-compute the inverse matrix and directly store the coefficients $b_{ij}$ of the inverse matrix instead of the direct coefficients $a_{ij}$. A step 4' is introduced between the step 3 providing the $n^2$ coefficients $a_{11}, \ldots, a_{ij}, \ldots, a_{nn}$, and the step 6a, or 6b, or 6c storing these coefficients, either at the providers or at the local memory LM.

As concerns retrieving the file F, the reconstruction steps 53, 63, 73 are modified by suppressing the computation of the inverse of the matrix $A=(a_{ij})$, since the computing means directly receive a matrix $B=(b_{ij})$ either from the providers or from the local memory LM.

A final remark concerns the local memory LM to store file descriptors that the device has to store in all three variants (although they have different sizes and contain different information). There are multiple possibilities to store these descriptors, which meet different security levels. The descriptors could indeed be stored:

in a tamper-proof hardware such as a smart card, on a local removable storage device (e.g. USB key, portable hard-drive, ...) that would be removed after the descriptor has been stored, in order to physically prevent further access to it, in a secured storage space managed by an Internet Service provider (e.g. on the set-top box), on a simple local storage device (e.g. laptop's hard-drive), at yet another storage service provider, e.g. in the cloud.

The first two options are particularly relevant for very secret documents in combination with variant c, while the last one should not be used except for not so sensitive data in combination with variant a, and with some guarantee that this last provider will not collude with the previous ones.

There is claimed:

1. A method for protecting confidentiality of a file distributed and stored at a plurality of storage service providers, comprising performing at a computing means of a user device, the steps of:

inputting a security parameter n, segmenting the file in n chunks $S_1, \ldots, S_n$, choosing $n^2$ coefficients $a_{ij}$ for i=1, \ldots, n and j=1, \ldots n, verifying that the vectors $a_{i1}, \ldots, a_{in}$ of the coefficients, for i=1, \ldots, n are linearly independent, otherwise generating the coefficients again, computing n linear combinations $C_i = a_{i1} \cdot S_1 + \ldots + a_{ij} \cdot S_j + \ldots + a_{in} \cdot S_n$, for i=1, \ldots, n, wherein each of the combinations $C_i$ is computed by the computing means using all of the n chunks $S_1, \ldots, S_n$ of the file, choosing n storage service providers $O_i, \ldots, O_n$ among said plurality of storage service providers, generating n file identifiers $ID'_1, \ldots, ID'_n$ designating said file transmitting and storing the combination $C_i$ at the storage service provider $O_i$ in association with the file identifier $ID'_i$, for each of i=1, \ldots, n, storing the file identifier $ID'_i$ and provider identifier $O_i$, for $i=1, \ldots, n$, in a file descriptor corresponding to the file, said file descriptor being stored in a local memory of the user device, and storing the set of coefficients $a_{i1}, \ldots, a_{in}$ so that it can be re-associated with the combination $C_i$, for $i=1, \ldots, n$;

wherein said choosing $n^2$ coefficients $a_{ij}$ for $i=1, \ldots, n$ and $j=1, \ldots, n$, comprises:

randomly choosing said $n^2$ coefficients $a_{ij}$ for $i=1, \ldots, n$ and $j=1, \ldots, n$, verifying that the vectors for $a_{i1}, \ldots, a_{in}$, for $i=1, \ldots, n$, are linearly independent, otherwise generating the coefficients again, randomly choosing n super-coefficients $a'_1, \ldots, a'_j, \ldots, a'_n$ for $j=1, \ldots, n$, computing a linear over-combination $OC' = a'_1 \cdot C_1 + \ldots + a'_j \cdot C_j + \ldots + a'_n \cdot C_n$, and storing the over-combination $OC'$ and the coefficients $a'_1, \ldots, a'_j, \ldots, a'_n$ for $j=1, \ldots, n$;

and wherein said storing the set of coefficients $a_{i1}, \ldots, a_{in}$, so that it can be re-associated with the combination $C_i$, for $i=1, \ldots, n$, comprises:

storing the set of coefficients $a_{i1}, \ldots, a_{in}$, at the storage service provider $O_k$, in association with a combination $C_k$ and a file identifier $ID'_k$, for $i=1, \ldots, n$ and for k lying between 1 and n, including 1 and n, and being different from i; and storing a permutation ($\sigma$) enabling to re-associate the set of coefficients $a_{i1}, \ldots, a_{in}$ and the combination $C_i$, for $i=1, \ldots, n$, in said file descriptor corresponding to the file, and being stored in said local memory for utilizing in reconstruction of the file.

2. The method according to claim 1, wherein storing the set of coefficients $a_{i1}, \ldots, a_{in}$, so that it can be re-associated with the combination $C_i$, for $i=1, \ldots, n$, comprises storing the set of coefficients at the storage service provider $O_i$, in association with the combination $C_i$ and the file identifier $ID'_i$, for $i=1, \ldots, n$.

3. The method according to claim 1, wherein storing the set of coefficients $a_{i1}, \ldots, a_{in}$, so that it can be re-associated with the combination $C_i$, for $i=1, \ldots, n$, comprises storing the set of coefficients $a_{i1}, \ldots, a_{in}$ in association with a file identifier $ID'_i$ and a provider identifier $O_i$, for $i=1, \ldots, n$, in said file descriptor corresponding to the file, and being stored in said local memory.

4. The method according to claim 1, wherein the n file identifiers $ID'_1, \ldots, ID'_n$ are the same for a given file.

5. A method for retrieving a file distributed and stored at a plurality of storage service providers, comprising performing at a computing means of a user device, the steps of:

reading n file identifiers $ID'_1, \ldots, ID'_n$ designating said file, and reading provider identifiers $O_1, \ldots, O_n$ corresponding to the plurality of storage service providers, in a file descriptor corresponding to the file, said file descriptor being stored in a local memory of the user device, sending the n file identifiers $ID'_1, \ldots, ID'_n$ respectively to the storage service providers designated by the provider identifiers $O_1, \ldots, O_n$, receiving n combinations $C_1, \ldots, C_n$, from the storage service providers designated by the provider identifiers $O_1, \ldots, O_n$, retrieving n sets of coefficients $a_{i1}, \ldots, a_{in}$, for $i=1, \ldots, n$, that respectively correspond to the n combinations $C_1, \ldots, C_n$, associating each combination $C_i$ with the corresponding set of coefficients $a_{i1}, \ldots, a_{in}$, for $i=1, \ldots, n$, computing the inverse of a matrix composed of the n set of coefficients $a_{i1}, \ldots, a_{in}$, for $i=1, \ldots, n$, for obtaining another matrix composed of n sets of coefficients $b_{i1}, \ldots, b_{in}$, for $i=1, \ldots, n$, then computing n chunks $S_1, \ldots, S_n$ of said file as:

$$S_i = b_{i1} \cdot C_1 + \ldots + b_{ij} \cdot C_j + \ldots + b_{in} \cdot C_n \text{ for } i=1, \ldots, n,$$

then re-assembling, at the computing means, the chunks $S_1, \ldots, S_n$ to reconstruct the file, wherein said re-assembling to reconstruct the file, further comprises:

reading an over-combination $OC'$ and coefficients $a'_1, \ldots, a'_j, \ldots, a'_n$ for $j=1, \ldots, n$, computing the inverse of a matrix composed of $n-1$ sets of coefficients $a_{i1}, \ldots, a_{in}$, for $i=1, \ldots, n-1$ and a set of coefficients $(a'_1 \cdot a_{1j} + \ldots + a'_i \cdot a_{ij} + \ldots + a'_n \cdot a_{nj})$ for $j=1, \ldots, n$, for obtaining another matrix composed of n sets of coefficients $b_{i1}, \ldots, b_{in}$, for $i=1, \ldots, n$, then computing n chunks $S_1, \ldots, S_n$ of said file as:

$$S_i = b_{i1} \cdot C_1 + \ldots + b_{ij} \cdot C_j + \ldots + b_{in-1} \cdot C_{n-1} + b_{in} \cdot OC' \text{ for } i=1, \ldots, n,$$

then re-assembling, at the computing means, the chunks $S_1, \ldots, S_n$ to reconstruct the file;

wherein said retrieving n sets of coefficients $a_{i1}, \ldots, a_{in}$ for $i=1, \ldots, n$, that respectively correspond to the n combinations $C_1, \ldots, C_n$, comprises receiving the n sets of coefficients from the storage service providers designated by the provider identifiers $O_1, \ldots, O_n$;

and wherein said associating each combination $C_i$ with a corresponding set of coefficients $a_{i1}, \ldots, a_{in}$, for $i=1, \ldots, n$ comprises:

reading a permutation ($\sigma$) in the file descriptor corresponding to said file, and applying the permutation to the sets of coefficients for $a_{i1}, \ldots, a_{in}$, for $i=1, \ldots, n$, so that each combination $C_i$ is associated with the corresponding set of coefficients $a_{i1}, \ldots, a_{in}$, for $i=1, \ldots, n$.

6. The method according to claim 5, wherein said retrieving n sets of coefficients $a_{i1}, \ldots, a_{in}$ for $i=1, \ldots, n$, that respectively correspond to the n combinations $C_1, \ldots, C_n$, comprises receiving the n sets of coefficients from the storage service providers designated by the provider identifiers $O_1, \ldots, O_n$, and wherein said associating each combination Ci with the corresponding set of coefficients $a_{i1}, a_{in}$, for $i=1, n$, comprises directly associating the combination Ci with the set of coefficients $a_{i1}, \ldots, a_{in}$.

7. The method according to claim 5, wherein said retrieving n sets of coefficients for $a_{i1}, \ldots, a_{in}$, for $i=1, \ldots, n$, that respectively correspond to the n combinations $C_1, \ldots, C_n$, comprises reading the n sets of coefficients in the file descriptor corresponding to said file, and wherein said associating each combination $C_i$ with a corresponding set of coefficients $a_{i1}, \ldots, a_{in}$, for $i=1, \ldots, n$ comprises directly associating the set of coefficients $a_{i1}, \ldots, a_{in}$ to the combination $C_i$, for $i=1, \ldots, n$.

8. The method according to claim 5, wherein said n file identifiers $ID'_1, \ldots, ID'_n$ are identical for a given file.

9. A method for protecting confidentiality of a file distributed and stored at a plurality of storage service providers, comprising performing at a computing means of a user device, the steps of:

inputting a security parameter n, segmenting the file in n chunks $S_1, \ldots, S_n$, randomly choosing $n^2$ coefficients $a_{ij}$ for $i=1, \ldots, n$ and $j=1, \ldots, n$, verifying that vectors $a_{i1}, \ldots, a_{in}$ of the coefficients, for $i=1, \ldots, n$, are linearly independent, otherwise generating the coefficients again, computing n linear combinations $C_i = a_{i1} \cdot S_1 + \ldots + a_{ij} \cdot S_j + \ldots + a_{in} \cdot S_n$, for $i=1, \ldots, n$, wherein each of the combinations $C_i$ is computed by the computing means using all of the n chunks $S_1, \ldots, S_n$ of the file, choosing n storage service providers $O_1, \ldots, O_n$ among said plurality of storage service providers, generating n file identifiers $ID'_1, \ldots, ID'_n$ designating said file, transmitting and storing the combination $C_i$ at the storage service provider $O_i$ in association with the file identifier $ID'_i$, for each of $i=1, \ldots, n$, storing the file identifier $ID'_i$ and provider identifier $O_i$, for $i=1, \ldots, n$, in a file descriptor corresponding to the file, said file descriptor being stored in a local memory of the user device, computing the inverse of a matrix composed of the n set of coefficients $a_{i1}, \ldots, a_{in}$, for $i=1, \ldots, n$, for obtaining another matrix composed of n sets of coefficients $b_{i1}, \ldots, b_{in}$, for $i=1, \ldots, n$, and storing the set of coefficients $b_{i1}, \ldots, b_{in}$ so that it can be re-associated with the combination $C_i$, for $i=1, \ldots, n$, randomly choosing said $n^2$ coefficients $a_{ij}$ for $i=1,\ldots,n$ and $j=1, \ldots, n$, and verifying that the vectors $a_{i1}, \ldots, a_{in}$, for $i=1, \ldots, n$, are linearly independent, otherwise generating the coefficients again;

wherein said storing the set of coefficients $b_{i1}, \ldots, b_{in}$ so that it can be re-associated with the combination $C_i$, for $i=1, \ldots, n$, comprises:

storing the set of coefficients $b_{i1}, \ldots, b_{in}$ at the storage service provider $O_k$, in association with a combination $C_k$ and a file identifier $ID'_k$, for $i=1, \ldots, n$ and for k lying between 1 and n, including 1 and n, and being different from i; and storing a permutation ($\sigma$) enabling to re-associate the set of coefficients $b_{i1}, \ldots, b_{in}$ and the combination $C_i$, for $i=1, \ldots, n$, in said file descriptor corresponding to the file, and being stored in said local memory for utilizing in reconstruction of the file.

10. The method according to claim 9, wherein said storing the set of coefficients $b_{i1}, \ldots, b_{in}$ so that it can be re-associated with the combination $C_i$, for $i=1, \ldots, n$, comprises storing the set of coefficients at the storage service provider $O_1$, in association with the combination $C_i$ and the file identifier $ID'_i$, for $i=1, \ldots, n$.

11. The method according to claim 9, wherein said storing the set of coefficients $b_{i1}, \ldots, b_{in}$ so that it can be re-associated with the combination $C_i$, for $i=1, \ldots, n$, comprises storing the set of coefficients $b_{i1}, \ldots, b_{in}$ in association with the file identifier $ID'_i$ and the provider identifier $ID'_i$, for $i=1, \ldots, n$, in said file descriptor corresponding to the file, and being stored in said local memory.

12. The method according to claim 9, wherein the n file identifiers $ID'_1, \ldots, ID'_n$ are the same for a given file.

13. A method for retrieving a file distributed and stored at a plurality of storage service providers, comprising performing at a computing means of a user device, the steps of:

reading n file identifiers $ID'_1, \ldots, ID'_n$ designating said file, and reading provider identifiers $O_1, \ldots, O_n$ corresponding to the plurality of storage service providers, in a file descriptor corresponding to the file, said file descriptor being stored in a local memory of the user device, sending the n file identifiers $ID'_1, \ldots, ID'_n$ respectively to the storage service providers designated by the provider identifiers $O_1, \ldots, O_n$, receiving n combinations $C_1, \ldots, C_n$, from the storage service providers designated by the provider identifiers $O_1, \ldots, O_n$, retrieving n sets of coefficients $b_{i1}, \ldots, b_{in}$, for $i=1, \ldots, n$, that respectively correspond to the n combinations $C_1, \ldots, C_n$, associating each combination $C_i$ with the corresponding set of coefficients $b_{i1}, \ldots, b_{in}$, for $i=1, \ldots, n$, computing chunks $S_1, \ldots, S_n$ of said file as:

$$S_i = b_{i1} \cdot C_1 + \ldots + b_{ij} \cdot C_j + \ldots + b_{in} \cdot C_n \text{ for } i=1, \ldots, n,$$

then re-assembling the chunks $S_1, \ldots, S_n$ to reconstruct the file;

wherein said retrieving n sets of coefficients $b_{i1}, \ldots, b_{in}$ for $i=1, \ldots, n$, that respectively correspond to the n combinations $C_1, \ldots, C_n$, comprises receiving the n sets of coefficients from the storage service providers designated by the provider identifiers $O_1, \ldots, O_n$;

and wherein said associating each combination $C_i$ with a corresponding set of coefficients $b_{i1}, \ldots, b_{in}$ for $i=1, \ldots, n$ comprises:

reading a permutation ($\sigma$) in the file descriptor corresponding to said file, and applying the permutation to the sets of coefficients $b_{i1}, \ldots, b_{in}$ for $i=1, \ldots, n$, so that each combination $C_i$ is associated with the corresponding set of coefficients $b_{i1}, \ldots, b_{in}$ for $i=1, \ldots, n$.

14. The method according to claim 13, wherein said retrieving n sets of coefficients $a_{i1}, \ldots, a_{in}$ for $i=1, \ldots, n$, that respectively correspond to the n combinations $C_1, \ldots, C_n$, comprises receiving the n sets of coefficients from the storage service providers designated by the provider identifiers $O_1, \ldots, O_n$, and wherein said associating each combination $C_i$ with a corresponding set of coefficients $b_{i1}, \ldots, b_{in}$ for $i=1, \ldots, n$, comprises directly associating the combination $C_i$ with the set of coefficients $b_{i1}, \ldots, b_{in}$.

15. The method according to claim 13, wherein said retrieving n sets of coefficients $b_{i1}, \ldots, b_{in}$ for $i=1, \ldots, n$, that respectively correspond to the n combinations $C_1, \ldots, C_n$, comprises reading the n sets of coefficients in the file descriptor corresponding to said file, and wherein said associating each combination $C_i$ with a corresponding set of coefficients for $i=1$, n comprises directly associating the set of coefficients $b_{i1}, \ldots, b_{in}$ to the combination $C_i$, for $i=1, \ldots, n$.

16. The method according to claim 13, wherein said n file identifiers $ID'_1, \ldots, ID'_n$ are identical for a given file.

17. A non-transitory digital data storage medium storing a set of machine executable program instructions, which, when executed on a computer, cause the computer to perform the method according to claim 1.

18. A computer program product comprising computer-executable program instructions stored on a non-transitory computer readable medium, for performing a method when the program instructions are run on a computer, the method comprising the method of claim 1.

\* \* \* \* \*